Feb. 24, 1942.   A. P. FERGUESON   2,274,133
HAND BRAKE LEVER ASSEMBLY
Filed March 23, 1940   2 Sheets-Sheet 1
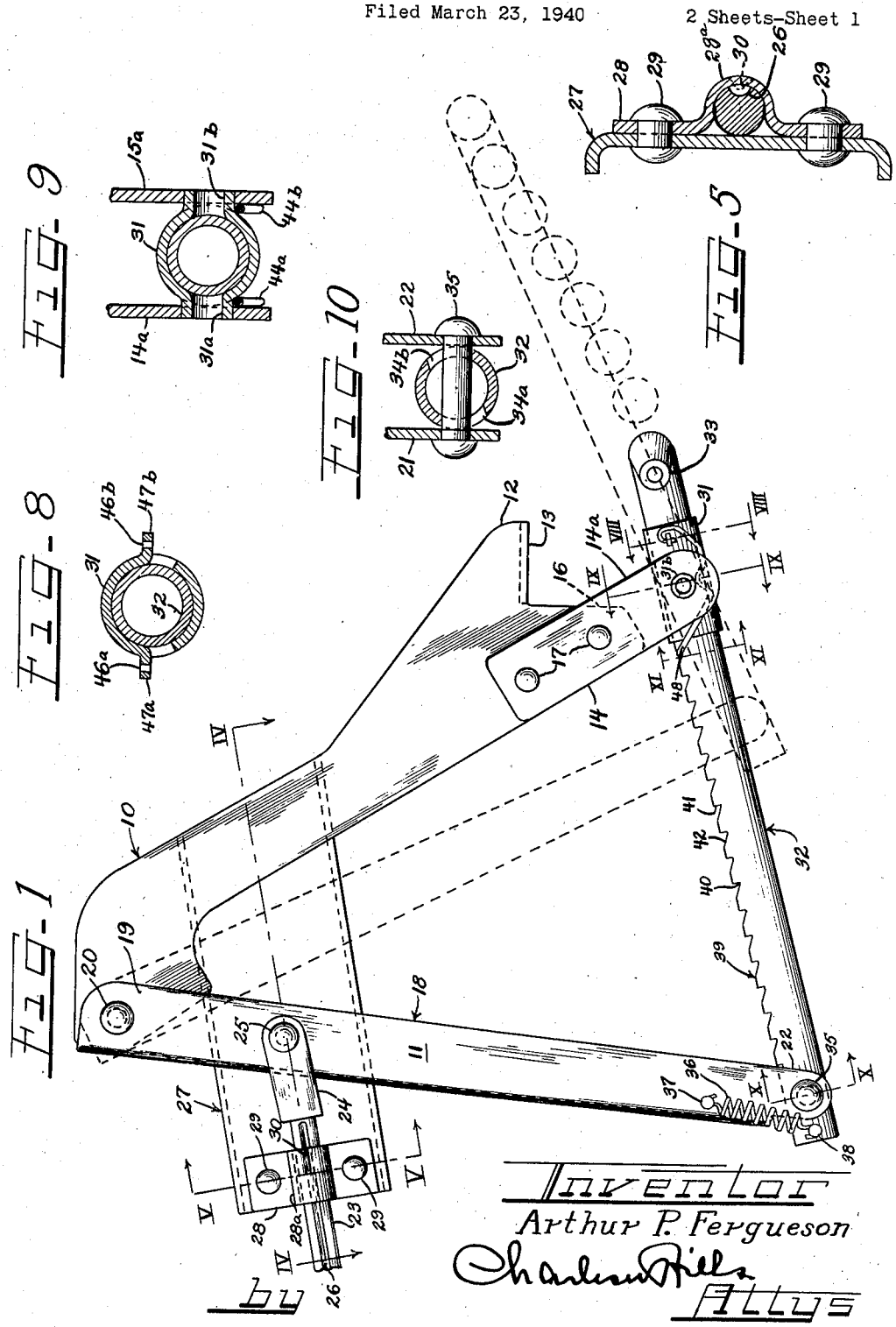
Inventor
Arthur P. Fergueson Feb. 24, 1942.    A. P. FERGUESON    2,274,133
HAND BRAKE LEVER ASSEMBLY
Filed March 23, 1940    2 Sheets-Sheet 2
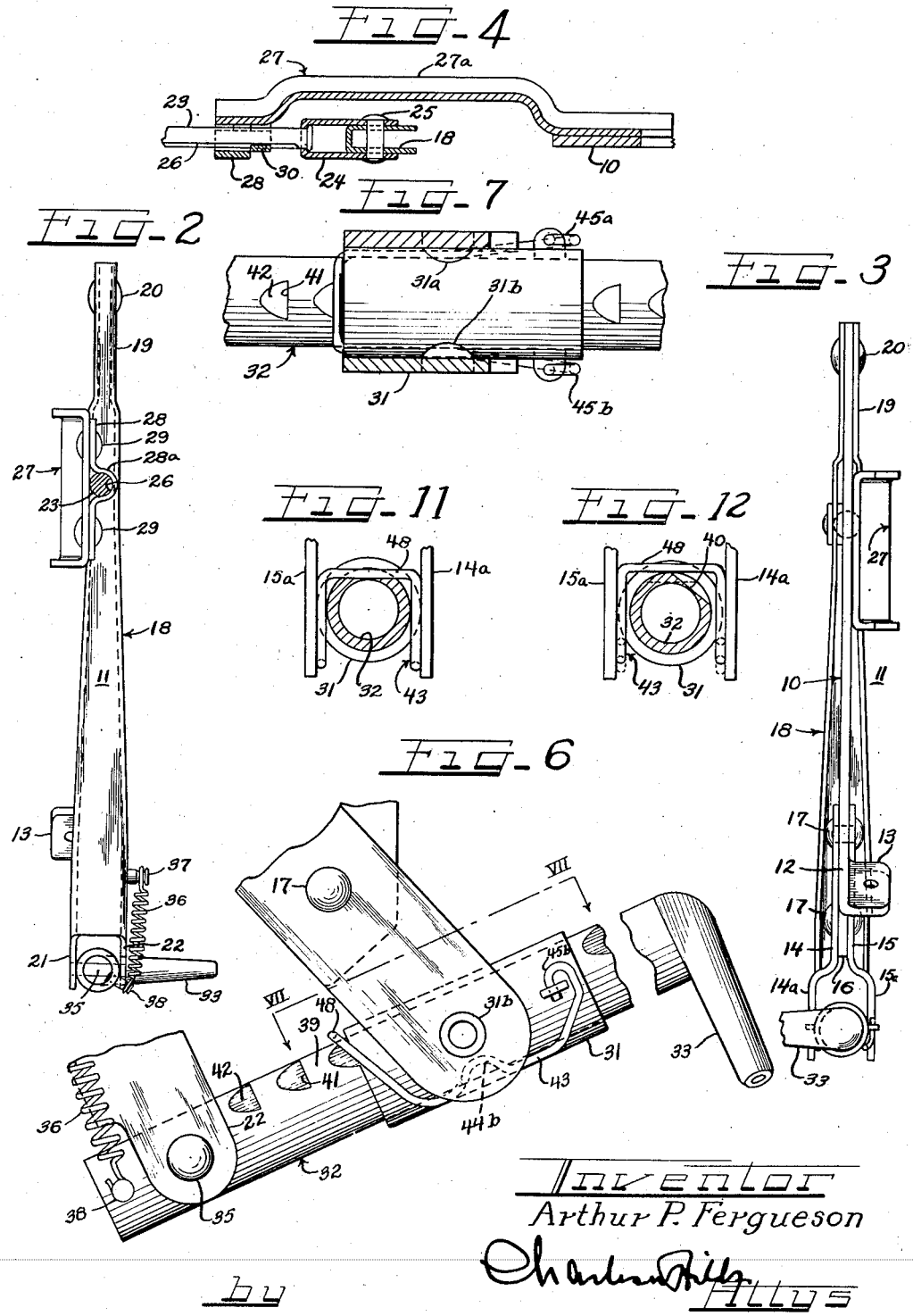
Inventor
Arthur P. Fergueson Patented Feb. 24, 1942

2,274,133

UNITED STATES PATENT OFFICE 2,274,133

HAND BRAKE LEVER ASSEMBLY

Arthur P. Fergueson, Detroit, Mich., assignor to Houdaille-Hershey Corporation, Detroit, Mich., a corporation of Michigan Application March 23, 1940, Serial No. 325,521

9 Claims. (Cl. 74—541)

This invention relates to a novel brake lever construction and more particularly to an improved brake-operating device whereby the brakes of an automotive vehicle are set and released by a substantially endwise movable actuating member which is held in and released from an adjusted position by rotative movement.

An important object of this invention is the provision of a brake lever construction in which a straight-pull type of lever arrangement is adapted to a swinging type of lever.

Another object of the invention is to provide a brake lever construction with an actuating member movable in substantial endwise direction for applying and releasing brakes, and which is held in and released from an adjusted position by rotative movement.

A further object of this invention is the provision of a combination straight-pull and swinging type of brake lever construction wherein the actuating member is held in adjusted position by the cooperation of a pawl and ratchet.

A further object of this invention is to provide a combination straight-pull and swinging type of brake lever construction having an actuating member with a novel release mechanism.

A still further object of the present invention is to provide a brake operating means which is simple in construction, durable and efficient in use, and which may be readily applied in place.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawings, in which:

Figure 1 is a side elevational view of a brake lever mechanism constructed in accordance with the principles of the present invention and diagrammatically illustrating, in dotted lines, the path of travel of the actuating handle as the actuating member is moved from a brake-released position to a brake-actuated position;

Figure 2 is an edge elevational view, as seen from the left, of the brake lever mechanism illustrated in Figure 1;

Figure 3 is an edge elevational view, as seen from the right, of the brake lever mechanism illustrated in Figure 1;

Figure 4 is a transverse cross-sectional view, with parts in elevation, taken substantially in the plane indicated by the line IV—IV of Figure 1;

Figure 5 is an enlarged transverse cross-sectional view, with parts in elevation, taken substantially in the plane indicated by the line V—V of Figure 1;

Figure 6 is an enlarged broken fragmentary view in side elevation of the lower portion of the brake lever mechanism illustrated in Figure 1, showing the relative positions of the parts when the actuating member is in a released position;

Figure 7 is a fragmentary plan and transverse cross-sectional view, with parts in elevation, taken substantially in the plane indicated by the line VII—VII of Figure 6;

Figure 8 is an enlarged vertical cross-sectional view, taken substantially in the plane indicated by the line VIII—VIII of Figure 1;

Figure 9 is an enlarged fragmentary vertical cross-sectional view, taken substantially in the plane indicated by the line IX—IX of Figure 1;

Figure 10 is an enlarged fragmentary vertical cross-sectional view, with a part in elevation, taken substantially in the plane indicated by the line X—X of Figure 1;

Figure 11 is an enlarged vertical cross-sectional view, with parts in elevation, taken substantially in the plane indicated by the line XI—XI of Figure 1; and Figure 12 is a view similar to Figure 11, illustrating the position of the parts as shown in Figure 6.

The brake lever construction herein illustrated is a straight-pull type of lever arrangement adapted to the swinging type of lever. It is similar to the so-called dash-type in that it is adapted to be pivoted behind the instrument board of an automotive vehicle, with the actuating grip portion projecting below and beyond the instrument board.

As particularly illustrated in Figure 1, one form of the invention is disclosed which includes a mounting plate or bracket 10 of flat metal stamped to proper size and form for pivotally supporting the brake lever assembly 11. The upper end of the supporting bracket 10 is attached in a suitable manner to the dash or a body portion of the vehicle. At the lower end of the bracket, there is provided an extending portion 12 having a laterally extending flange 13 which is supported by and connected to the inturned flange of the instrument panel (not shown).

As best shown in Figures 1 and 3, a pair of legs 14 and 15 are connected to the extension end 16 of the bracket 10 adjacent the flange 13 by rivets 17 or other similar means. The extending portions of each leg are offset outwardly, as shown at 14a and 15a, to form a bifurcated or forked leg structure.

A link member 18 of tapered U-shaped configuration is provided at its upper end with a portion 19 in which the side walls are parallel and spaced sufficiently close to straddle the upper end of the bracket 10 to which it is pivotally connected by a pin or rivet 20. The side walls of the link member 18 at its lower end extend downwardly to provide spaced parallel legs 21 and 22.

The braking mechanism of the vehicle (not shown) may be suitably connected to the link member 18 by means of an actuating rod 23 and a clevis 24 which straddles the link member and is connected to its side walls by means of a bolt or rivet 25. Movement of the link member about its pivot 20 actuates the braking mechanism through movement of the brake rod 23. A guiding mechanism is provided to allow the actuating rod 23 to be reciprocated in a single plane while at the same time preventing any rotational movement thereof.

As shown in Figures 1, 4 and 5, a channel-shaped bracket 27 is connected at one end, as by welding or other similar means, to the bracket 10 in such angular relationship that its longitudinal axis is parallel with the axis of the reciprocating rod 23. A U-shaped bracket or strap 28 is connected to the other end of the channel-shaped bracket 27 by means of rivets 29. The central U-shaped portion 28a of the strap embraces the reciprocating rod 23 for the purpose of axially guiding the rod during its reciprocating movement. A portion of the U-shaped part of the strap is bulged inwardly to form a lug 30 which seats within the longitudinal slot 26 provided in the reciprocating rod 23 to prevent rotational movement thereof.

A central portion 27a of the channel-shaped bracket 27 is offset outwardly to define swinging clearance for the link member 18 and the clevis 24 which connects the link member to the brake actuating mechanism.

A short tubular member or bushing 31 (Figures 1, 6, 7 and 9) is provided with oppositely disposed and outwardly extending trunnions 31a and 31b which are received in suitable apertures provided in the outturned leg portions 14a and 15a. The tubular bushing 31 slidingly embraces an elongated tubular actuating member 32 having its end portion, adjacent the bushing, formed as an offset handle 33. At the end opposite the handle 33, the actuating member 32 is provided with a pair of oppositely disposed slots 34a and 34b extending in a circumferential direction of the member.

A pivot 35, which may be a rivet, bolt or the like, is passed through suitable apertures provided in the spaced legs 21 and 22, at the bottom of the link member 18, and the oppositely disposed slots 34a and 34b of the actuating member 32 to pivotally connect the latter between the spaced legs of the link member. With the parts so connected, as shown in Figure 10, the actuating member 32 is capable of being rotated within limits provided by the ends of the slots 34a and 34b.

A coil spring 36 is provided with hook-like ends, one of which is connected to a lug 37 projecting from the link member 18 and its other hook-like end connected to a similar lug 38 projecting from the end of the actuating member 32. The coil spring 36 serves to hold the actuating member 32 against rotation in a position in which the longitudinal row of teeth forming the ratchet 39 is held in upright position. The ratchet 39 is formed by a plurality of teeth 40 each having a square face 41 and a cam surface 42 sloping upwardly away from the handle end of the actuating member 32.

A loop-shaped wire spring 43 serves as a pawl to retain the actuating member 32 in any desired adjusted position. In plan view, the wire pawl 43 is of U-shape with its looped end portion adapted to seat within a tooth 40 to retain the actuating member in adjusted position. As viewed from the side (Figure 6), the wire pawl 43 straddles the bushing 31 in such a manner that the upstanding U-shaped portions 44a and 44b seat against the trunnions 31a and 31b provided on the bushing 31 (Figure 9).

The free ends of the wire pawl legs extend angularly upward from the central U-shaped portions and terminate in inturned hook-like portions 45a and 45b (Figure 7) which pass through apertures 46a and 46b provided in outwardly extending lugs 47a and 47b struck out of the side walls of the bushing 31 (Figure 8). The other or looped end 48 of the wire pawl extends upwardly and away from the central portion of the pawl and beyond the bushing 31 to normally engage with a tooth 40 of the ratchet 39.

With the pawl positioned as described, the spring-like tendency thereof urges the looped end 48 of the pawl into normal engagement with a tooth 40. If the actuating handle 33 is rotated in a counter-clockwise direction within the limits defined by the ends of the slots 34a and 34b, the ratchet teeth 40 are moved beyond the zone of engagement with the looped end 48 of the pawl. The parts in this position are illustrated in Figure 6, and it is to be noted that the looped end 48 of the pawl bears against the outside surface of the actuating member 32 adjacent the ratchet teeth 40 in an inoperative position. When rotating pressure is released from the handle 33, the coil spring 36 serves to rotate the actuating member back to its original position of alignment between the looped end of the pawl and each of the ratchet teeth for cooperative engagement therebetween.

To actuate the brakes to a "set" position, the operator merely grasps the handle 33 and pulls it toward him or in a direction to the right as shown in Figure 1. During movement of the actuating member 32 in this direction, the looped end 48 of the pawl member slides along the slanting surfaces 42 of the ratchet teeth 40. Tension of the brake-actuating mechanism, as exerted through the actuating rod 23, tends to pull the actuating rod 32 in a reverse direction. This tendency is overcome by engagement of the looped end 48 of the pawl against a square surface 41 of one of the ratchet teeth 40, thereby holding the actuating member 32 in adjusted position. To release the actuating member 32, the operator merely rotates the actuating member by rotating the laterally extending handle 33 in counter-clockwise direction, as described previously. The parts in this position (Figure 6) allow the actuating member 32 to be freely reciprocated in either endwise direction.

It is to be noted that the link member 18 is swung about its pivot 20 by substantially an endwise push-pull action exerted on the handle 33 of the actuating member 32. As diagrammatically illustrated in dotted lines in Figure 1, the handle travels in a path shown by a series of circles, each circle indicating a successive position of the handle. The degree of upward displacement of the handle in its successive actuating positions is determined by the operative lengths of the several levers and the angularity provided therebetween. It is preferred that these relationships be such that the handle 33 travels in a path as nearly as possible in alignment with its longitudinal axis when in a brake-released position.

The brake lever construction described herein provides a swinging type of lever which is actuated by a substantially straight-pull type of lever, the latter being held in adjusted position by a spring wire pawl and released for endwise movement by rotation.

While a particular embodiment only of this invention has been illustrated, it will, of course, be understood that the invention should not be limited thereto, since many modifications may be made, and it is therefore contemplated by the appended claims to cover all such modifications as fall within the true spirit and scope of the present invention.

I claim as my invention:

1. A lever construction comprising a support, a lever arranged for pivotal connection to said support to swing, a toothed actuating member, means on said support for pivotally and slidably carrying said actuating member, a pivot pin passing through and connecting said lever to said actuating member for rotational movements of the latter about its own longitudinal axis and about the longitudinal axis of said pivot pin, and a resilient clutch member being carried at one end by said means and biased of its own accord into engagement with the teeth of said actuating member for holding the latter in an adjusted position.

2. A lever construction comprising a lever arranged for pivotal connection to a support to swing, an actuating member pivotally connected to the support and arranged to slide relative thereto, said actuating member having a row of ratchet teeth along an edge thereof and circumferentially extending diametrically opposed slots in the sidewalls thereof, a pivot member passing through said slots and said lever for connecting the lever to the actuating member for rotation of the latter about its own longitudinal axis and about the longitudinal axis of said pivot member, means normally resisting rotation of said actuating member about its own longitudinal axis, and clutch means extending over and down the sides of said actuating member for engagement therewith, said clutch means engaging a ratchet tooth to hold the actuating member in an adjusted position when the latter is in a non-rotated position and inoperatively engaging a portion of the actuating member adjacent said teeth when the actuating member is rotated.

3. A lever construction comprising a support member, a lever pivotally connected to said support to swing, an actuating member having longitudinally aligned ratchet teeth, a tubular member for slidably supporting said actuating member, trunnions on said tubular member for pivotally connecting the latter to said support, means connecting said actuating member to said lever for rotation of the actuating member about its own longitudinal and transverse axes, and a spring clutch member having a U-shaped portion arranged over and down the sides of said actuating member, said spring clutch member being carried at one end by said tubular member and having an intermediate portion engaging said trunnions for biasing the U-shaped portion into engagement with the actuating member, the U-shaped portion of said clutch member normally engaging a ratchet tooth for holding the actuating member in an adjusted position and inoperatively engaging the actuating member adjacent said teeth when the actuating member is rotated.

4. A brake lever construction comprising a support, a link having a U-shaped cross-section for a major portion of its length and spaced legs at one end thereof, the U-shaped end of said link being pivotally connected to one end of said support to swing for actuating and releasing brakes, a tubular member having one end formed as a handle for moving it in substantially an endwise direction and its other end pivotally connected to and between the spaced legs of said link, said pivotal connection between said link and tubular member being arranged for rotation of said tubular member within defined limits, spring means normally resisting said rotation, said tubular member being supported at the other end of said support for endwise and rotatable movement, said tubular member having teeth formed on its outside surface, and clutch means normally engaging one of said teeth to restrict endwise movement of said tubular member in but one direction, said clutch means being rendered inoperative when said tubular member is rotated for rendering said tubular member free for movement in either endwise direction.

5. A brake lever construction comprising an elongated support of flat material having a flat end and a bifurcated end, a link having a U-shaped cross-section terminating in apertured spaced legs at one end, the U-shaped end of said link being pivotally connected in straddling relation to the flat end of said support for said link to swing, brake rod mechanism pivotally connected to said link for actuating and releasing brakes as the link swings, guide means on said support for guiding the brake rod mechanism, a tubular actuating member having one end formed as a handle for moving said member in substantially an endwise direction, the other end of said actuating member having oppositely disposed circumferentially extending slots, a pivot passing through and connecting in straddling relation the spaced legs of said link and the slotted end of said actuating member whereby the actuating member is rotatable between limits defined by the ends of said slots, a coil spring normally resisting rotation of said actuating member, a longitudinal row of teeth formed along an outer edge of said actuating member, each of said teeth having a square face and a cam surface sloping toward the handle end of said actuating member, a short tubular member embracing said actuating member for sliding engagement therewith, outwardly extending trunnions formed on the sides of said short tubular member, said trunnions seating within apertures provided in the bifurcated end of said support for pivotally supporting said short tubular member, and a loop-shaped spring straddling said short tubular member, said loop-shaped spring having its free ends connected to said short tubular member and its central portions engaging said trunnions and its looped portion normally engaging one of said teeth in the actuating member to restrict endwise movement thereof in a brake-releasing direction, said tooth and spring engagement being rendered inoperative when said actuating member is rotated to allow it to be moved in either endwise direction for actuating or releasing brakes.

6. A spring-wire pawl construction for a brake lever of substantially U-shape in plan view and W-shape in side view, said wire pawl embracing a support and having its ends connected to the support, and the U-shaped looped end of said pawl adapted to engage with a ratchet, said looped end being urged into said engagement by pressure exerted by the seating engagement of the central portions of the pawl legs with a portion of the support to which it is connected.

7. A spring-wire pawl of U-shaped configuration having the central portions of its legs bent upwardly from its U-shaped plane to seat against a support, and its end portions arranged in angular relation to its central portions, the free ends of said legs being shaped with inwardly offset and downwardly facing hook portions for connection to a support, said ends and seated portions normally urging the loop-shaped end in a direction for engaging a ratchet.

8. A guide for a reciprocating rod having a longitudinal slot therein, comprising a plate support, a bracket having a semi-cylindrical central portion and laterally extending legs arranged to be connected to said plate support, said semi-cylindrical portion and a face of said plate support coacting to embrace said reciprocating rod, and an indented lug on and extending in an axial direction of said semi-cylindrical portion for seating within the longitudinal slot in said reciprocating rod to restrict movement of said rod to an axial direction only.

9. A brake applying mechanism comprising a support having a bifurcated end, a swinging member pivotally connected at one end to said support and having a bifurcated portion at its other end, a brake-setting member operatively connected to said swinging member, a tubular member having trunnions pivotally mounted in the bifurcated end of said support, an actuating member slidably embraced by said tubular member and having an end straddled by the bifurcated end of said swinging member, ratchet teeth along an edge of said actuating member, a pivot connecting said bifurcated and straddled ends for relative pivotal and limited rotational movements, and a spring wire pawl connected to said tubular member and having a loop extending beyond said tubular member in straddling relation to said actuating member, said pawl loop being biased of its own accord into normal engagement with a ratchet tooth to hold said actuating member in an adjusted position to which it is moved.

ARTHUR P. FERGUESON.